April 19, 1960

G. F. JUDE ET AL 2,933,268

AUTOMATIC FLIGHT CONTROL SYSTEM FOR AIRCRAFT

Filed Nov. 13, 1956

2 Sheets-Sheet 2

INVENTORS
GEORGE F. JUDE
JAMES W. WHEELER
EVERETT S. JOLINE
BY
Arthur H. Serrell
ATTORNEY

United States Patent Office 2,933,268
Patented Apr. 19, 1960

2,933,268

AUTOMATIC FLIGHT CONTROL SYSTEM FOR AIRCRAFT

George F. Jude, Flushing, James W. Wheeler, Sea Cliff, and Everett S. Joline, Huntington Station, N.Y., assignors to Sperry Rand Corporation, a corporation of Delaware Application November 13, 1956, Serial No. 621,856

18 Claims. (Cl. 244—77)

This invention relates generally to an automatic flight control system for aircraft. More particularly, the invention concerns a combination speed and attitude controlling and stall preventing system for automatically piloting an aircraft. In preventing the craft from attaining a stall condition, the system functions in accordance with deviation of the craft above a reference angle of attack to monitor an air speed reference means and thereby adjust the means included in the system for controlling the speed of the craft along its flight path. The improved system is effective under both cruising and landing approach conditions of flight of the craft. In operations with an angle of attack sensor, the system enables the aircraft to fly at an angle of attack yielding the highest lift to drag ratio.

An object of the invention is to provide a control system including the noted components that is effective with consideration of gross weight and flap deflection conditions to prevent the craft from attaining a stall condition under both cruising and landing approach conditions of flight.

A feature of the invention resides in the inclusion in the system of a means for monitoring an air speed reference that includes an angle of attack sensor to provide a stall preventing margin of safety for the aircraft.

Another feature of the invention resides in provision of means for compensating the improved system for the effect of wind gusts on the craft and on the air stream direction director of the angle of attack sensor of the system. The gust compensator of the system provides an output in accordance with the difference between angle of attack peaks and the average value of the angle of attack of the craft.

Still a further feature of the invention is in the provision of a servo driven synchro in the system operative to change the pitch attitude of the craft through the automatic pilot in anticipation of correction of the speed of the craft along its flight path line.

Figure 1:
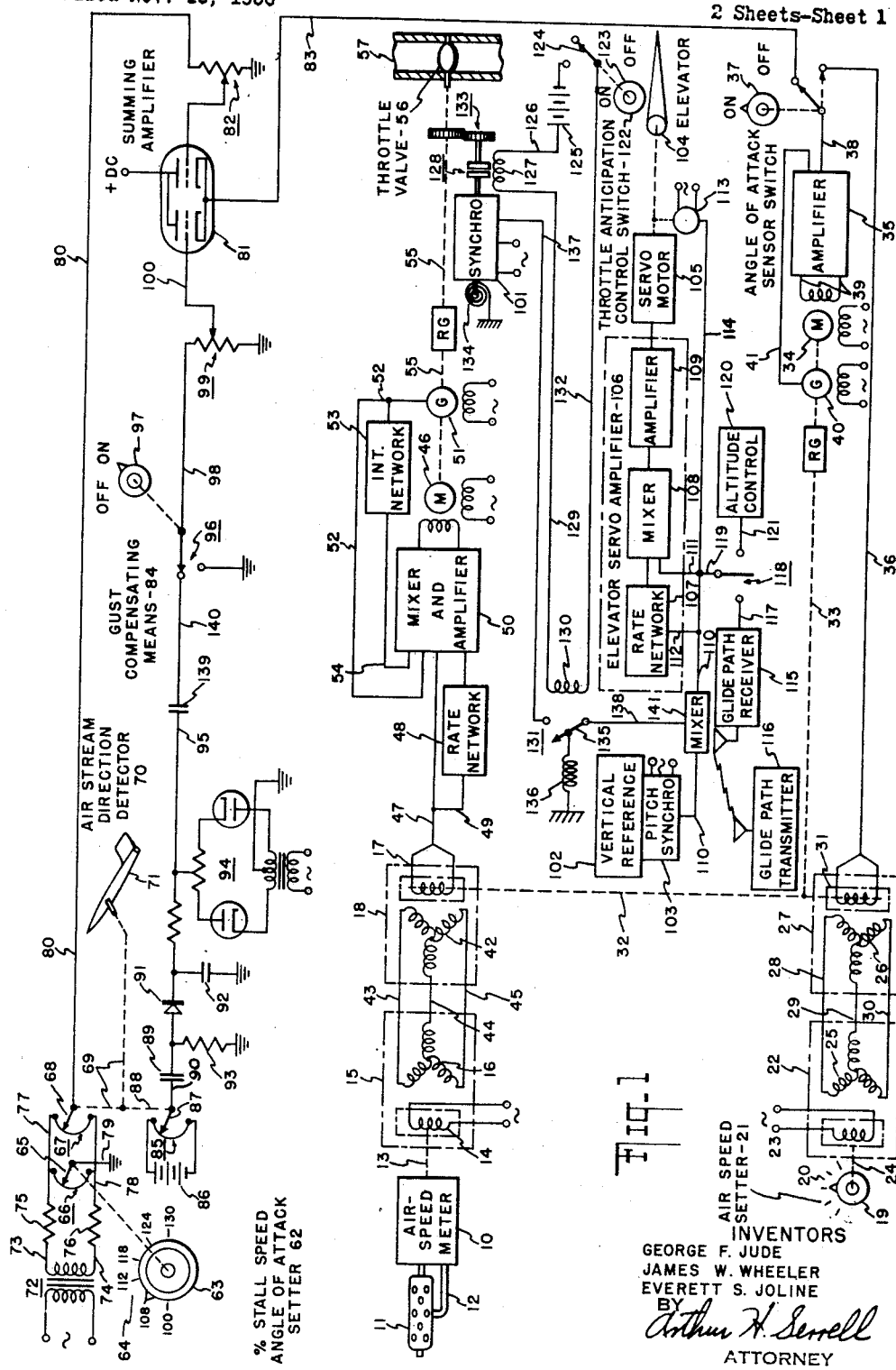
Figure 2:
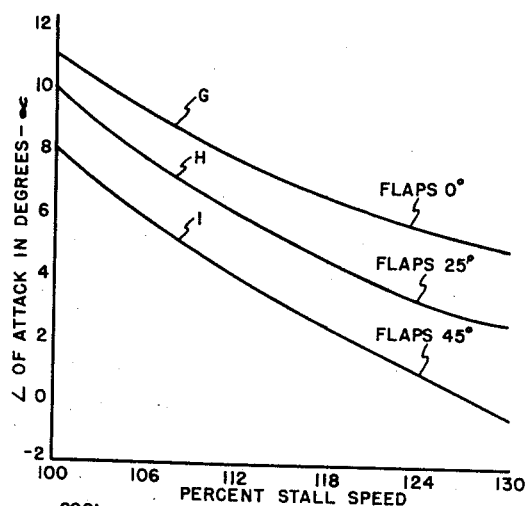
Figure 3:
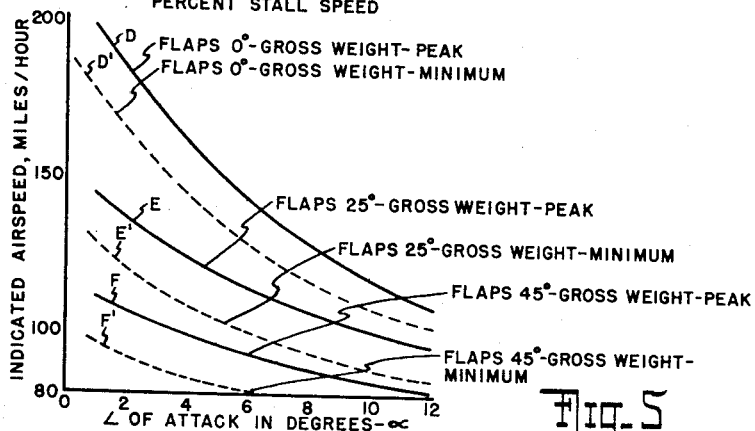
Figure 5:
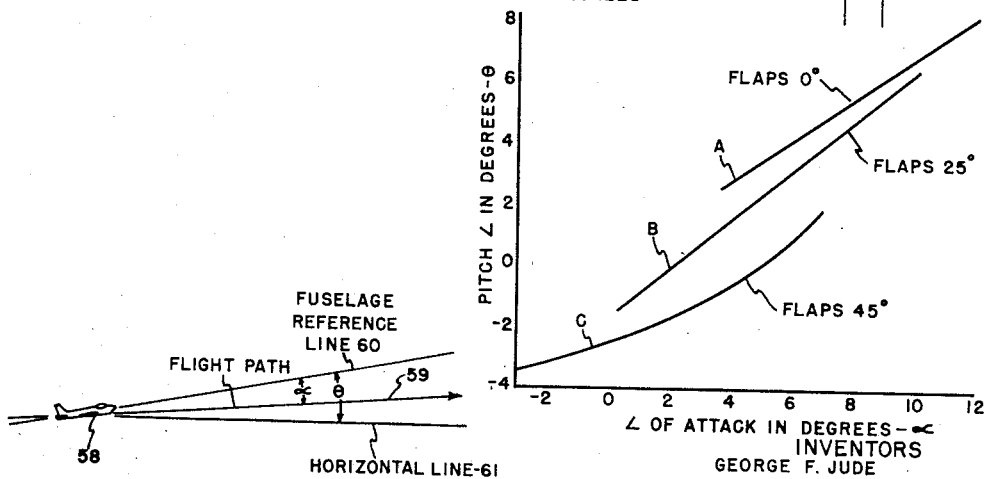
Figure 4:
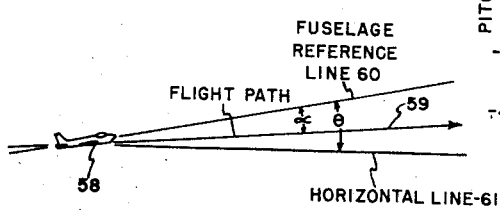

Other objects, features and structural details of the invention will become apparent from the following description when read in relation to the accompanying drawings in which:

Fig. 1 is a schematic view and circuit diagram showing the mechanical and electrical elements of a single embodiment of our improved flight control system, Figs. 2 and 3 are graphs used in explanation of the setting of the element designated in Fig. 1 as the percent of stall speed angle of attack setter, Fig. 4 is a diagrammatic view showing the relation between the attack angle α and pitch angle θ, and Fig. 5 is a graph showing the relation between the noted angles for different flap conditions of the aircraft.

As depicted in Fig. 1 of the drawing, the improved system includes means for controlling the speed of the craft along its flight path in accordance with the general teaching of the automatic speed control system shown in U.S. Letters Patent 2,626,767, issued January 27, 1953 to R. N. Bromley. The components of the improved system relating to the regulation of the craft's forward speed include an air speed meter 10 of conventional form with a bellows sensitive element (not shown) that is responsive to the difference in pressures between a total pressure or dynamic pitot tube 11 and a static pressure pitot tube 12. In the diagrammatically shown meter 10, translation of a rod (not shown) attached to the sensitive element results in rotation of a shaft 13 whose position provides a measure of the air speed of the craft in which the meter is located. As shown in Fig. 1, the shaft 13 controls the wound rotor 14 of a selsyn type signal generator, synchro or pick-off 15 whose stator winding is indicated at 16. The rotor 14 is energized from a suitable source of alternating current electrical energy. The speed controlling component of the improved system further includes a means with the air speed meter 10 that provides an output upon departure of the air speed of the craft from a reference air speed. In this connection, the wound rotor 17 of a second two part pick-off or signal generator 18 of the selsyn type is positioned by the human pilot of the craft by the manual setting of the index of knob 19 in relation to a suitable air speed scale 20. The manually adjustable air speed setter is designated generally in the drawing at 21. As illustratively depicted, setter 21 and the rotor 17 of generator 18 are interconnected by a synchro or pick-off 22, of the same type as pick-off 15, whose rotor winding 23 energized from a suitable source of alternating current electrical energy is connected to knob 19 by suitable shafting 24. Adjustment of knob 19 accordingly results in corresponding motion of the wound rotor 23 of the pick-off 22. The wound stator 25 of signal generator 22 is connected to a like element 26 in a second signal generator 27 by way of leads 28, 29 and 30. The wound rotor of the generator 27 designated at 31 is connected by shafting 32 to the rotor 17 of the signal generator 18. Further, the common shaft connected rotors 17 and 31 are driven by a meshing shafting 33 through operation of a motor designated at 34 by way of suitable reduction gearing. The motor 34 is energized by the output of the data transmission system including the pick-offs or generators 22, 27, the signal from the wound rotor 31 thereof being fed to amplifier 35 by way of lead 36, the angle of attack sensor switch 37 set in the off position with the blade of the switch in the dotted line position indicated in the drawing, and lead 38. As represented, motor 34 is a suitable two-phase induction electric motor whose control field winding is energized by the output of amplifier 35 by way of leads 39. The fixed field winding of the motor 34 is indicated as continuously excited from a suitable alternating current source of supply. In the arrangement provided, motor 34 operates to drive the rotor 31 of the pick-off 27 to provide a null signal output at which position it is in rotational agreement with the rotor 23 as set by the knob 19. The rotor 17 of the pick-off or generator 18 is likewise positioned in accordance with the air speed reference as determined by the air speed setter 21. In the described arrangement damping may be provided by the inclusion of a generator 40 which is coupled to and driven by the motor 34. The generator 40 illustratively depicted as having a winding continuously energized from a suitable alternating current source functions to provide a voltage signal output which is proportional in amplitude to the speed of the motor 34 and has a phase sense depending upon the direction of rotation of the motor. The output of the generator 40 is fed to amplifier 35 by way of lead 41 to effect the necessary damping.

The interconnected generators 15 and 18 of the speed controlling system provide a data transmission network in which the position of the rotor 14 reflecting actual air speed as controlled by the meter 10 is compared with the reference position of the rotor 17 as determined by the setter 21. In this regard, the stator element 42 is connected to the stator part 16 of generator 15 by way of leads 43, 44 and 45 in the same manner shown for the like pick-offs 22 and 27. Accordingly, the described components constitute a means for providing a voltage signal output that is proportional to departures of the aircraft from the reference air speed as determined by the air speed setter 21. The phase of the output signal of the rotor 17 of generator 18 of the described means depends on the sense of the departure of the air speed of the craft with respect to the reference air speed. The amplitude of the control signal output is proportional to the extent of the departure.

The output of the generator or pick-off 17 of the system is utilized to monitor the flight of the craft by regulation of its prime mover or movers through suitable means for controlling the forward speed of the same. As represented herein for illustrative purposes, the signal of pick-off or generator 18 controls the operation of a suitable two-phase servomotor 46 being connected thereto by way of lead 47, and a suitable mixer and amplifier 50 whose output is fed the control winding of the servomotor 46. A second input to the mixer and amplifier 50 is in accordance with a measure of the rate of change of the control signal. This signal is obtained from a suitable rate network 48 by way of lead 49 connected to lead 47. The fixed field winding of servomotor 46 is shown as continuously excited from a suitable source of alternating current. In accordance with the teaching of the hereinbefore noted Bromley patent, both displacement and rate feedback signal inputs to the mixer and amplifier 50 are provided by means of an alternating current speed generator 51 driven by the servomotor 46. Lead 52 carries the rate signal output of generator 51 to the amplifier 50. The displacement signal is obtained by a bypassing integrating network 53 that receives an input from lead 52 and changes the rate signal output of the generator 51 to a displacement signal. The output of network 53 is fed to the amplifier 50 by way of lead 54. As shown, the servomotor 46 is connected by suitable shafting 55 and reduction gearing to operate the throttle valve 56 in the throat 57 of a carburetor that functions to control the power or thrust of the engine or prime movers of the aircraft and accordingly its forward speed along the flight path. The described speed controlling system functions to maintain the craft at an actual air speed that is in agreement with the selected air speed value determined by the human pilot's setting of the setter 21. Movement of the knob 19 of the setter 21 to a different air speed value causes operation of the system until the output of the generator 18 is restored to a null condition by corresponding change in the speed of the craft by the prime movers thereof and the resultant change in the position of the rotor 14 of the pick-off or generator 15.

The monitoring means provided in accordance with the teaching of the present invention to prevent the craft from attaining a stall condition is effective through operation of the described speed controlling means. When incorporated in the system, the angle of attack sensor switch 37 is turned to the "on" position in which the blade of the switch is shown in full lines in Fig. 1. In this position, the circuit to the amplifier 35 from generator 27 is broken at the switch 37 and the control afforded the system by the air speed setter 21 is transferred to the monitoring means which then operates through motor 34 to position the movable part or rotor 17 of the generator or pick-off 18 of the speed controlling system.

Fig. 4 of the drawing depicts a craft 58 whose flight path is along a line designated at 59. The angle of attack α of the craft is indicated in this figure as defined by the angle between the line 59 and a fuselage reference line 60. The attitude of the craft relative to its pitch axis is also herein represented as defined by the pitch angle θ which is the angle between the fuselage reference line 60 and a horizontal line 61. It will be understood that the lines 59, 60 and 61 lie in a vertical plane that includes the longitudinal axis of the aircraft 58. The angles are considered positive when the same are above the line 61 and negative when the same are below the line 61. In the representation shown, the craft 58 is depicted in a positive pitch attitude where the same is gaining altitude or climbing. The relation between the designated angles for a particular craft under flight conditions where the flaps are positioned respectively at zero, twenty five degree and forty five degree angles are shown in the three curves A, B and C of the graph constituting Fig. 5 of the drawing. Curves B and C are included as the improved system has utility in preventing stalls under approach landing conditions of flight of the craft as well as in cruising flight conditions where the flaps are at the raised or zero angle position. The relationship between angle of attack and air speed for a particular craft for different flight conditions of gross weight and flap position is graphically indicated by the full line and dotted line curved D, D', E, E', and F, F' of Fig. 3. For a given flight condition, an angle of attack α providing a stall preventing margin of safety is selected to monitor the air speed reference generator 18 of the improved system. With relation to the curves G, H and I of the Fig. 2, the selected angle of attack α for any of the flap positions noted in the graph is indicative of the proper setting of a percent stall speed angle of attack setter indicated at 62 in Fig. 1. As shown, the setter consists of an indexed knob 63 that is set in relation to a percent of stall speed scale 64 by the human pilot. The reading of the setter 62 shown in the drawing is 108 percent stall speed. In the form of the invention depicted in Fig. 1, the knob 63 controls the position of the slider 65 of a potentiometer 66 that is situated in a bridge network with a second potentiometer 67 whose slider 68 is positioned by way of suitable shafting 69 to an air stream direction detector 70 shown as an angle of attack vane 71 that is pivotally mounted in the craft in a location in the air stream of the craft. The detector 70 may be provided by any angle of attack sensor that provides an angular measure of the air stream direction with respect to a fixed axis in the aircraft that corresponds with the fuselage reference line 60 of Fig. 4. The vane 71 is located on the craft so that the local air flow thereat is unaffected by inflow to the propellers, by changes in the position of the flaps, or by extension of the landing gear.

The bridged potentiometers 66, 67 are shown as energized from a suitable source of alternating current electrical energy by way of transformer 72 and input leads 73, 74, resistors 75, 76 and leads 77, 78. Lead 79 connects slider 65 to the ground, and lead 80 connected to slider 68 feeds the output of the bridge network to an amplifier 81 by way of an adjustable potentiometer 82. The output of the amplifier 81 provides the input to the amplifier 35 by way of lead 83, the "on" positioned angle of attack sensor switch 37 and lead 38. In the described arrangement, the bridge constitutes a means for operating the motor 34 or moving the rotor 17 of the generator 18 in accordance with departure of the aircraft from a reference angle of attack as determined by the setter 62. The bridge of the described circuitry provides an output signal that measures the difference between the actual angle of attack as reflected in the position of slider 68 and the determined reference angle of attack reflected in the position of slider 65. The output of the bridge means is phase sensitive so that the setter 72 establishes an angle of attack reference that determines the air speed at which the craft is to be controlled. In operation, when the angle of attack α exceeds the selected value, the reference air speed established for the system is increased and servomotor 46 operates to control valve 56 to increase the air speed of the craft until the measured angle of attack reaches a value that balances the bridge network. When the angle of attack α is below the selected value, the reference air speed established for the system is decreased and servomotor 46 operates to control valve 56 to decrease the air speed of the craft. Accordingly, the system operates to establish a reference angle of attack for controlling the air speed of the craft. The operation of the motor component 34 integrates the signal output of amplifier 81 from the angle of attack network to eliminate the presence in the system of short period transients.

In particular, for approach landing flight conditions with or without radio guidance, the system includes a means for compensating for the effect of wind gusts on the craft and detector 70. The gust compensating means provides an output signal in accordance with the difference between angle of attack peaks and the average value of the angle of attack of the craft. In order to land an airplane in gusty air with the same margin of safety from stall that is obtained in calm air, it is necessary to make the approach at a higher speed than is required in calm air. The circuit compensating for winds, gusts, in the system accordingly provides for this additional needed speed. The gust compensating means of the system is generally indicated at 84, the components thereof including a potentiometer 85 that is connected across a suitable source of direct current or battery 86. The slider 87 of potentiometer 85 is actuated by shafting 88 connected to the shafting 69 from the angle of attack vane 71. The slider 87 is shown connected to a capacitor 89 by way of lead 90. The average value of the angle of attack is removed from the output signal of the potentiometer by the capacitor 89. The resulting signal is then fed to a series combination of crystal diode 91 and capacitor 92 causing the capacitor to charge up to a voltage proportional to the peak positive deviation of angle of attack above its average. If no additional gusts are encountered, this signal voltage decays at a rate determined by the time constant of the capacitor 92, the back resistance of the diode 91 and resistance 93 to ground. The output of the peak holding circuit is then modulated by an alternating current signal from a diode modulator as indicated at 94, whose frequency and phase corresponds to the frequency of the alternating current supply to the transformer 72. Lead 95 carries the modulated signal of the gust compensating means circuit. Capacitor 139 and lead 140 carry the signal to a two position switch 96 which provides an off-on control for the gust compensator. As shown in Fig. 1, the switch blade of switch 96 is in a closed condition with the knob set with its index designating "on." Lead 140 carrying the output of the gust compensating means is accordingly connected by way of the closed switch 96, lead 98, potentiometer 99 and lead 100 to the second grid of amplifier 81 which in the structure shown is a summing amplifier, with separate cathode, grid and plate components, that functions as a means for combining the input signals thereto. In the "off" position of switch 96, the half of the summing amplifier controlled by the gust signal means is connected to ground. The respective potentiometers 82 and 99 of the arrangement adjust the proper proportion of gust compensator signal to angle of attack error signal from the reference for optimum operation. The control input signals to amplifier 81 are added in such a way as to increase the average air speed reference by a value proportional to the magnitude of the peak gusts encountered. The combined error and gust signals are then fed to the motor amplifier 35 by way of lead 83, switch 37 in the "on" position and lead 38 where the same are effective to control the position of the rotor of the generator 18 constituting the air speed reference of the system. The peak holding circuit component of the described gust compensating means provides a measure of the transient variations of the angle of attack sensor or detector 70 of the system.

During cruising or approach landing flight conditions, when the throttle valve 56 of the system is advanced or retracted an appreciable change in the lift of the craft occurs. This effect is reduced in the improved system by coupling a signal from a synchro or pick-off 101 driven by the servomotor 46 controlling the throttle valve into an automatic pilot operable to control the attitude of the craft about its pitch axis. The components of the automatic pilot shown in Fig. 1 include a suitable vertical reference 102 with a pitch pick-off or synchro 103. Reference 102 of the automatic pilot may be a suitable gyro vertical whose connected synchro 103 provides an output that is proportional to the pitch angle θ of the craft as defined in Fig. 4. With an output from the pick-off 103 that depends on the sense of the angle, the automatic pilot is effective to control the attitude of the craft about its pitch axis with respect to the vertical reference 102. The control is effected through operation of the elevators 104 of the craft by a servomotor 105. The components comprising the illustratively depicted automatic pilot include an elevator servo amplifier 106 with a rate network 107, a mixer 108 and an amplifier 109. The control signal from synchro 103 is fed to the mixer 108 by way of leads 110 and 111. A rate of the displacement signal output of the synchro 103 is taken by the rate network 107 whose input is derived by way of lead 112 thereto from the output lead 110. The output of the network 107 is fed the mixer 108 where it is combined with the direct displacement signal thereto from synchro and a feedback signal provided by a further synchro 113 whose rotor is positioned by the shafting interconnecting the servomotor 105 and elevator 104. The feedback signal from synchro 113 is fed the mixer 108 by way of leads 114 and 111. As represented in Fig. 1, the combined signals from the mixer 108 are fed the amplifier 109 which in turn provides the output necessary to drive the servomotor 105. Further components of the automatic pilot may include a suitable glide path receiver 115 controlled from the signal of a ground located glide path transmitter 116. The signal of receiver 115 is introduced into the automatic pilot by way of lead 117, a switch 118 when the blade thereof is closed in the left hand position represented in the figure and lead 119 to the input mixer lead 111. With the receiver 115 included in the automatic pilot, the craft is in an approach landing flight condition and the combined controls constitute a means for piloting the aircraft automatically along a radio glide path at a controlled attitude about its pitch axis with respect to a vertical reference. In a cruising flight condition of the craft, the automatic pilot may include an altitude control 120 that may be included in the system by way of lead 121, switch 118, closed in the right hand position thereof as viewed in Fig. 1, lead 119 and lead 111 to the mixer 108. The system as then conditioned constitutes a means for piloting the aircraft automatically along a constant altitude path at a controlled attitude about its pitch axis with respect to a vertical reference.

In the improved system, the synchro 101 is coupled to the automatic pilot by a circuit that includes a throttle anticipation control switch 122 whose indexed knob 123 may be turned to the "on" position by the human pilot. In this condition, the blade 124 of the switch 122 closes a circuit that includes battery 125, lead 126, the winding 127 of an electromagnetic clutch 128, lead 129, the winding 130 of a relay 131, and return lead 132. Clutch 128 functions to engage the rotor element of the synchro or pick-off 101 and the shafting 55 driven by the servomotor 46. As shown, this drive is effected through the meshing pinions 133. A coil spring 134 is fixedly mounted at one end thereof and connected at a free end to the shaft of the rotor of the synchro 101, the spring acting to return the rotor to a zero signal output position in relation to the stator of the synchro under conditions wherein the switch 122 is in the "off" position and the faces of the clutch 128 are accordingly disengaged. The armature 135 of the relay 131 is biased to an open position by spring 136 when the switch 122 is in the "off" position. The circuit coupling the synchro 101 and automatic pilot includes output lead 137, the armature 135 of relay 131 when in energized condition and lead 138 to a mixer 141 in input lead 110. When the human pilot turns the switch 122 to its "on" position, clutch winding 127 and relay winding 130 are energized. This results in engagement of the faces of the clutch 128 and connects the synchro 101 to the shafting 55. The armature 135 of relay is also moved against the action of the spring 136 to close the circuit interconnecting the synchro 101 and the automatic pilot. The sense of the output signal of the synchro 101 to the automatic pilot is such that where the action of the throttle valve 56 is to result in a decrease in the speed of the craft, the automatic pilot functions to increase the pitch angle of the craft sufficiently to maintain the constant lift condition. The reverse sense signal is similarly effective to decrease the pitch angle of the craft through the automatic pilot to maintain the constant lift condition. The term "throttle anticipation" is applied to the control switch 122 inasmuch as the action of the automatic pilot in changing the pitch attitude of the craft precedes the action of the throttle valve as reflected through control of the prime movers of the craft in restoring the air speed of the craft to the reference provided by the rotor of the generator 13. Throttle anticipation by the means herein provided is useful in both cruising and approach landing flight conditions of the aircraft.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. The combination in a speed controlling and stall preventing system for aircraft, having means for controlling the forward speed of the aircraft, means providing an output with departure of the airspeed of the aircraft from a reference airspeed, and a servomotor for operating said speed controlling means responsive to the output of said airspeed output means; of, means for monitoring the airspeed reference of said airspeed output means to provide a stall preventing margin of safety for the aircraft including an aircraft angle of attack sensor, means settable in accordance with a reference angle of attack providing the stall safety margin for the aircraft, and means responsive to said sensor and settable means for operating said airspeed output means in accordance with departure of the aircraft from the reference angle of attack.

2. A combination of the character claimed in claim 1, in which said monitoring means further includes means responsive to said sensor providing a gust compensating output, and said airspeed output means is further operated by the output of said gust compensating means.

3. In an aircraft control system, the combination of, an air speed meter, an aircraft angle of attack sensor, settable means for determining a reference angle of attack for the aircraft, means operatively connected to said sensor and reference means for providing an output in accordance with the difference between the actual angle of attack and the determined reference angle of attack, a pick-off with two relatively movable parts having an output, means connecting the air speed meter and one of the relatively movable parts of the pick-off, means connecting the output difference means to the other of the relatively movable parts of the pick-off, and a servomotor operated by the output of the pick-off for controlling the forward speed of the aircraft.

4. In an aircraft control system, the combination of, an airspeed meter, an aircraft angle of attack sensor, settable means for determining a reference angle of attack for the aircraft, first means operatively connected to said sensor and reference means for providing an output in accordance with the difference between the actual angle of attack and the determined reference angle of attack, second means operatively connected to said sensor providing a gust compensating output in accordance with the difference between angle of attack peaks and the average value of the angle of attack of the aircraft, means for combining the outputs of said first and second output providing means, a pick-off with two relatively movable parts having an output, means connecting the airspeed meter and one of the relatively movable parts of the pick-off, means connecting said combining means with the other of the relatively movable parts of the pick-off, and a servomotor operated by the output of said pick-off for controlling the forward speed of the aircraft.

5. A stall preventing servo system for aircraft including a servomotor operable to control the forward speed of the craft, a signal generator providing an output for operating said servomotor having a stator and a rotor, a device for measuring the air speed of the craft operatively connected to the stator of the generator, means for moving the rotor of the generator, and means for operating said moving means in accordance with the difference between a measure of the actual angle of attack of the craft and a determined reference angle of attack.

6. A stall preventing servo system for aircraft including a servomotor operable to control the forward speed of the craft, a signal generator providing an output for operating said servomotor having a stator and a rotor, a device for measuring the air speed of the craft operatively connected to the stator of the generator, means for moving the rotor of the generator, and means for operating said moving means having two inputs one of which is proportional to the difference between a measure of the actual angle of attack of the craft and a determined reference angle of attack and the other of which is in accordance with the difference between angle of attack peaks and the average value of the angle of attack.

7. In an aircraft speed controlling system, means for controlling the forward speed of the aircraft, and means for operating said speed controlling means including an aircraft angle of attack sensor, and means connected to said sensor providing a gust compensating input to said speed operating means in accordance with a measure of the magnitude of the transient variations of said sensor.

8. In an aircraft speed controlling system, means for controlling the forward speed of the aircraft, and means for operating said speed controlling means including an aircraft angle of attack sensor, settable means for determining a reference angle of attack for the aircraft, first means operatively connected to said sensor and reference means for providing an output in accordance with the difference between the actual angle of attack and the determined reference angle of attack, second means operatively connected to said sensor providing a gust compensating output in accordance with the difference between angle of attack peaks and the average value of the angle of attack of the aircraft, and means for combining the outputs of said first and second output providing means.

9. In a flight control system for aircraft, an automatic pilot for controlling the attitude of the aircraft about its pitch axis with respect to a vertical reference, means for controlling the forward speed of the aircraft, means providing an output with departure of the airspeed of the aircraft from a reference airspeed, a servomotor for operating said speed controlling means responsive to the output of said airspeed output means, and signal means driven by said servomotor for operating said automatic pilot to modify the pitch attitude of the aircraft in accordance with the output of said airspeed output means.

10. A system of the character claimed in claim 9 including means for monitoring the airspeed reference of said airspeed output means in accordance with departures of the aircraft from a reference angle of attack.

11. In a flight control system for aircraft, an automatic pilot for controlling the attitude of the aircraft about its pitch axis with respect to a vertical reference, means for controlling the forward speed of the aircraft, means providing an output with departure of the airspeed of the aircraft from a reference airspeed, a servomotor for operating said speed controlling means responsive to the output of said airspeed output means; means for monitoring the airspeed reference of said airspeed output means to provide a stall preventing margin of safety for the aircraft including an aircraft angle of attack sensor, means settable in accordance with a reference angle of attack providing the stall safety margin for the aircraft, means responsive to said sensor and settable means for operating said air speed output means in accordance with departure of the aircraft from the reference angle of attack; and means for operating said automatic pilot to modify the pitch attitude of the aircraft in accordance with the monitored output of said airspeed output means.

12. A flight control system for aircraft as claimed in claim 11, in which said monitoring means further includes means responsive to said sensor providing a gust compensating output in accordance with differences between angle of attack peaks and the average value of the angle of attack, and said airspeed output means is further operated by the output of said gust compensating means.

13. In an approach landing control system for aircraft, means for piloting the aircraft automatically along a radio glide path at a controlled attitude about its pitch axis with respect to a vertical reference, means for controlling the forward speed of the aircraft, means providing an output with departure of the airspeed of the aircraft from a reference airspeed, a servomotor for operating said speed controlling means responsive to the output of said airspeed output means, and signal means driven by said servomotor for operating said piloting means to modify the pitch attitude of the aircraft in accordance with the output of said airspeed output means.

14. A system of the character claimed in claim 13, including means for monitoring the airspeed reference of said airspeed output means in accordance with departures of the aircraft from a reference angle of attack.

15. In an approach control system for aircraft, means for piloting the aircraft automatically along a radio glide path at a controlled attitude about its pitch axis with respect to a vertical reference, means for controlling the forward speed of the aircraft, means providing an output with departure of the airspeed of the aircraft from a reference airspeed, a servomotor for operating said speed controlling means responsive to the output of said airspeed output means; means for monitoring the airspeed reference of said airspeed output means to provide a stall preventing margin of safety for the aircraft including an aircraft angle of attack sensor, means settable in accordance with a reference angle of attack providing the stall safety margin for the aircraft, means responsive to said sensor and settable means for operating said airspeed output means in accordance with departure of the aircraft from the reference angle of attack; and means for operating said piloting means to modify the pitch attitude of the aircraft in accordance with the monitored output of said airspeed output means.

16. An approach control system for aircraft as claimed in claim 15, in which said monitoring means further includes means connected to said sensor providing a gust compensating input to the airspeed output means in accordance with differences between angle of attack peaks and the average value of the angle of attack.

17. In a flight control system for aircraft, means for piloting the aircraft automatically along a constant altitude path at a controlled attitude about its pitch axis with respect to a vertical reference, means for controlling the forward speed of the aircraft, means providing an output with departure of the airspeed of the aircraft from a reference airspeed, a servomotor for operating said speed controlling means responsive to the output of said airspeed output means, and signal means driven by said servomotor for operating said piloting means to modify the pitch attitude of the aircraft in accordance with the output of said airspeed output means.

18. A system of the character claimed in claim 17, including means for monitoring the airspeed reference of said airspeed output means in accordance with departures of the aircraft from a reference angle of attack.

No references cited.